Dec. 5, 1967
W. MOJELSKI
3,355,777
TENSION ACTUATED CLAMP
Filed March 30, 1966
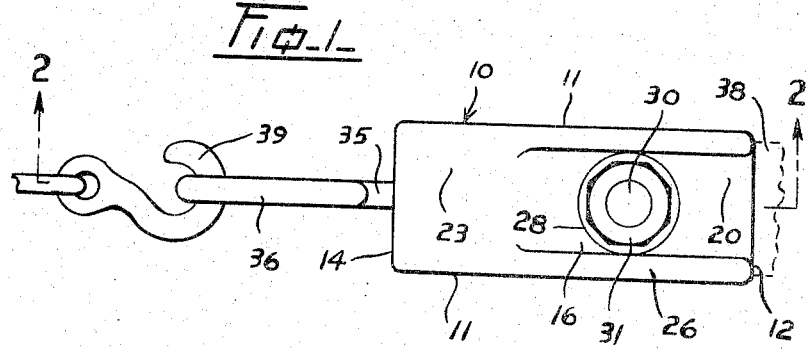
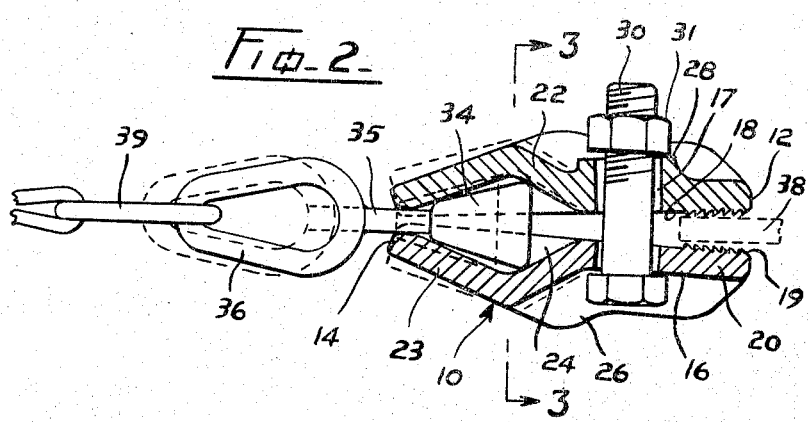
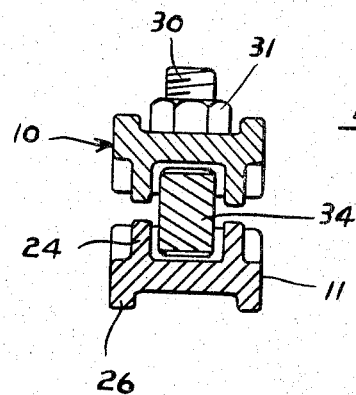
INVENTOR
WILLIAM MOJELSKI
Ernest E Carver
Agent United States Patent Office 3,355,777
Patented Dec. 5, 1967

3,355,777
TENSION ACTUATED CLAMP
William Mojelski, 965 Lilian, Port Coquitlam,
New Westminster, British Columbia, Canada
Filed Mar. 30, 1966, Ser. No. 538,685
4 Claims. (Cl. 24—81)

My invention relates to clamps and more particularly to a clamp intended for use in an automobile body repair shop.

Such a repair shop is required to straighten dented and twisted metal parts which often are not readily accessible from at least one side of the body part. One expedient often practised is to anchor the car and attach to the damaged part a gripping member which in turn is secured to some pulling equipment, i.e. a hydraulically operated mechanism capable of exerting the required tension under control of the repairman.

One such gripping member is simply a pair of tongs, but such a tool must be supported in some way prior to the pulling force being applied. This is both awkward and time consuming. Also, the gripping force applied by a pair of tongs is difficult to control, and this tends to damage and weaken the part clamped by the tongs. Other gripping members can be tightened into a position of use, but this usually entails the tightening of one or more bolts. Again, such a task takes up enough of a repairman's time to be an important factor in the total output of the shop.

I have found that the foregoing difficulties and disadvantages may be materially reduced by providing a tool which is quickly and easily attached to the car part so as to be self-supporting, and which will exert an evenly distributed clamping pressure to irregularly shaped or difficult-to-reach parts of the car. By means of the tool, it can be ensured that the pressure applied is restricted to amounts which will avoid damage to the part clamped.

A tool according to the present invention includes, a clamp having a pair of plates, and means securing the pair of plates together in face-to-face relation constructed and arranged so that the plates are movable, freely towards and away from one another and, at the same time, can rock about to some extent so that they are, in effect, universally mounted. The pair of plates have gripping jaws at one end, and converging levers at the opposite end. A coacting wedge block is mounted between the converging levers, with means being provided on the wedge block for attachment to a pulling member.

Referring to the drawings:

FIGURE 1 is an elevation of the clamp.

FIGURE 2 is a longitudinal section taken on the line 2—2 of FIG. 1.

FIGURE 3 is a transverse section taken on the line 3—3 of FIG. 2.

The clamp has a pair of plates 10 which, preferably, are cast from a good quality steel so as to be capable of withstanding heavy stress and rough usage.

The plates 10 are rectangular, see FIG. 1, and have side edges 11 and end edges 12 and 14. As shown best in FIG. 2, the plates have body portions 16 in which aligned openings 17 are formed. Near the edges 12, the flat, inner faces 18 of the plates are provided with integrally formed teeth 19 which are coarse, i.e. widely spaced apart, and deeply cut into said faces. These teeth extend from side-edge to side-edge of the plates and are parallel to, and extend a short distance inwardly from, the end edges 12. Thus, the toothed portions of the plates form toothed jaws indicated by the numeral 20.

Each body portion 16 is cranked outwardly as at 22, on a side of the opening 17 remote from the jaw, and then converges inwardly forming lever 23. The cranked portions 22 and the converging levers 23 are reinforced by integral webs 24 which are spaced from the side edges 11 of the plates, see FIG. 3. Reinforcing flanges 26 are formed on outer faces 27 of the plates near the side edges 11, the flanges extending from the edges 12 to the levers 23. Preferably, one of the plates has a boss 28 on its outer face surrounding the opening 17.

A bolt 30 is used to connect the pair of plates 10. This bolt is received in the openings 17 with its head abutting the outer face 27 of one of the plates. Fitted to the bolt 30 is a nut 31 which bears against the boss 28 on the other plate. The diameter of the bolt is some ⅛ to ³⁄₁₆ of an inch less than the diameter of the openings 17. Thus, the plates have free sliding movement on the bolt and, in addition can be swivelled and rocked, somewhat in the manner which would be possible if the plates were universally mounted. The extent to which the plates can be rocked about the bolt is, of course, limited by the position of the nut and the relative sizes of the bolt and the openings. It is important to note the plates can be moved towards and away from one another as required, and adjusted so that they are angularly disposed to one another.

Mounted between the levers 23 is a wedge block 34 which is retained therein by means of the webs 24. The block 34 has a short shank 35 which projects beyond the ends 14 of the plates, and this projecting end is provided with an elongated eye 36.

If a crumbled fender is required to be straightened in a body repair shop, it is common practice to braze a small strip of metal to the outer surface of the fender at the point tension is to be applied to the damaged part. Such a metal strip, indicated by the numeral 38, is known as a pull-tab. To attach the present tool, the jaws 20 are placed over the pull-tab 38 and the nut 31 is tightened. Normally, a wrench is not required for this purpose, the nut being hand tightened so that the clamp is supported solely by the pull-tab.

At this time the several parts of the clamp will assume positions shown in FIG. 2. The pulling mechanism usually includes a length of chain fitted with a hook 39 or the like, securable to the eye 36. When the mechanism is actuated to tension the chain, the wedge block 34 is drawn partly out of the space between the levers 23 whereupon the jaws are rocked into positive clamping engagement with the tab 38.

It has been found that the plates 10 are seldom rocked beyond the parallel positions shown by dotted lines in FIG. 2, since only a pulling force in excess of the normal requirement will cause such movement. Thus, the jaws are substantially parallel to the two clamped surfaces of the pull-tab, and therefore there is little tendency to bite into and weaken the tab. The clamping pressure applied by the jaws being evenly distributed over the pull-tab, a positive grip is provided. Thus, the clamp is unlikely to be loosened by the force required to straighten a fender or similar body member.

The clamp will also serve as a means for gripping car body parts having opposite faces which are not parallel, as are the faces of a pull-tab. When used to grip, say, a tapered part, the plates are adjusted on their connecting bolt so that they are disposed at an angle to one another. At this time the wedge block will not be at its best operating position relative to the angularly disposed lever, but will be sufficiently buttressed thereby to act upon the other lever and cause the jaws to close effectively. Thus, the clamp is capable of gripping irregular shaped objects such as are likely to be found about a car body.

In some instances it is not necessary temporarily to attach a pull-tab 38, since some part of the damaged member may be gripped by the present tool. For example, when two panels are joined together to form a fender their abutting edges are provided with perpendicular flanges which are welded to form what is known in the trade as a "pinch-weld". Such a joint is, of course, painted over at the factory, and later may be coated with undercoating material or the like, so that it is difficult to grip with conventional tools. However, the coarse teeth 19 on the clamp are slow to become clogged to a point where they cannot grip properly and, when eventually they are rendered ineffective for this reason, are easily cleaned. This results in a further saving of time which is all important in an auto body repair shop.

What I claim is:

1. A clamp comprising a pair of plates, means securing the pair of plates in face-to-face relation, said securing means being adjustable to vary the spacing between the pair of plates and to provide at least one of said pair of plates with limited universal movement, said pair of plates having jaws at one end and converging levers at the opposite end, a wedge block between the converging levers and means for securing the wedge block to a pulling member.

2. A clamp as claimed in claim 1, wherein the securing means is a bolt and a nut, said pair of plates having aligned openings through which the bolt loosely extends at substantially right angles to the opposing faces of the pair of plates.

3. A clamp as claimed in claim 1, wherein said converging levers are provided with inner webs, said wedge block being slidably mounted between the inner webs.

4. A clamp as claimed in claim 1, wherein the wedge block has a shank projecting outwardly of the converging levers and an eye is formed on the exterior end of the shank.

References Cited

UNITED STATES PATENTS

| | | | |
|---|---|---|---|
| 549,731 | 11/1895 | Lantau | 24—81 |
| 764,838 | 7/1904 | Bush. | |
| 1,635,200 | 7/1927 | Zilliox | 24—81 |
| 2,608,730 | 9/1952 | Killius | 24—73 |

DONALD A. GRIFFIN, *Primary Examiner.*